(12) United States Patent
Gulliksen

(10) Patent No.: US 6,679,607 B2
(45) Date of Patent: Jan. 20, 2004

(54) COOLING DEVICE IN A PROJECTOR

(75) Inventor: Morten Gulliksen, Oslo (NO)

(73) Assignee: InFocus Corporation, Wilsonville, OR (US)

( * ) Notice: Subject to any disclaimer, the term of this patent is extended or adjusted under 35 U.S.C. 154(b) by 8 days.

(21) Appl. No.: 09/975,239

(22) Filed: Oct. 11, 2001

(65) Prior Publication Data

US 2002/0041363 A1 Apr. 11, 2002

(30) Foreign Application Priority Data

Oct. 11, 2000 (NO) .......................................... 20005115

(51) Int. Cl.⁷ ........................ G03B 21/16; G03B 21/18; G03B 21/14; F21V 29/00
(52) U.S. Cl. ........................... 353/61; 353/52; 353/57; 353/119; 362/294; 165/80.3
(58) Field of Search ............................... 353/61, 52, 57, 353/119; 362/294; 165/80.3

(56) References Cited

U.S. PATENT DOCUMENTS

| | | | |
|---|---|---|---|
| 2,779,236 A | | 1/1957 | Pollan ............................ 88/24 |
| 5,860,719 A | | 1/1999 | Suzuki et al. .................. 353/61 |
| 6,004,010 A | * | 12/1999 | Inage et al. ................... 362/294 |
| 6,132,049 A | * | 10/2000 | Yamaguchi et al. ........... 353/61 |
| 6,231,191 B1 | | 5/2001 | Shiraishi et al. ............... 353/61 |
| 6,254,238 B1 | | 7/2001 | Takamatsu ..................... 353/61 |
| 6,280,038 B1 | * | 8/2001 | Fuse et al. ..................... 353/57 |
| 6,340,237 B1 | * | 1/2002 | Koga et al. .................. 362/294 |
| 6,350,033 B1 | * | 2/2002 | Fujimori ....................... 353/61 |
| 6,443,575 B1 | * | 9/2002 | Miyamoto et al. ............. 353/58 |

* cited by examiner

Primary Examiner—Russell Adams
Assistant Examiner—Magda Cruz
(74) Attorney, Agent, or Firm—Schwabe, Williamson &Wyatt, P.C.

(57) ABSTRACT

A device for cooling a projector includes a plurality of air intakes positioned upstream from a suction fan having an integrated motor. A light source of the projector is disposed between a first air intake and the suction fan so that a first air flow, drawn by the fan through the first air intake, flows around and pulls heat away from the light source. A second air intake is positioned to admit a second air flow, also drawn by the fan, that passes through a duct positioned adjacent an upstream side of the suction fan to direct the second air flow against the fan motor. The second air flow, which has a temperature that is not substantially affected by the light source, cools the fan motor and forms an insulating air layer that protects the fan motor from being damaged by the high temperatures of the first air flow.

10 Claims, 2 Drawing Sheets

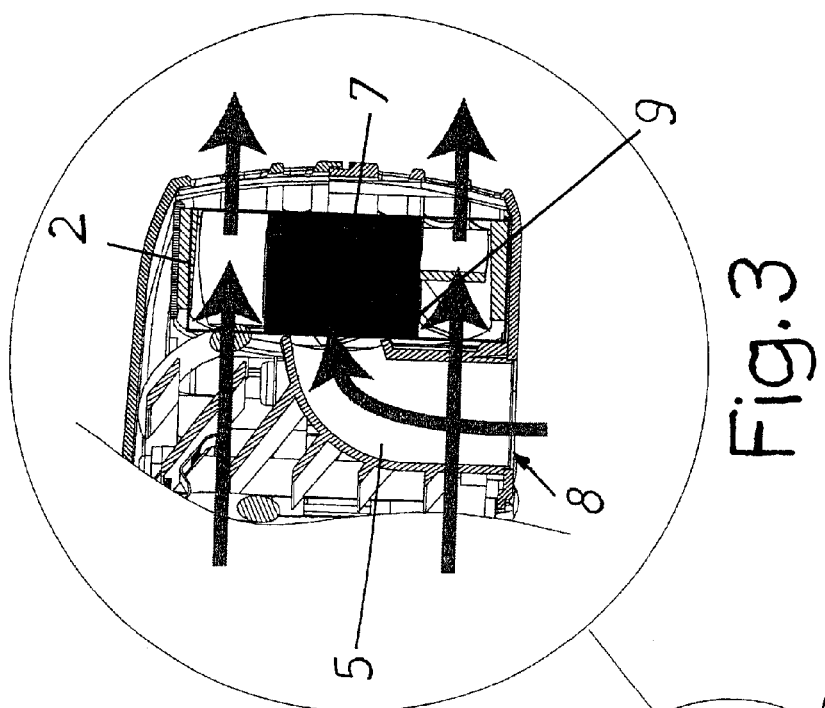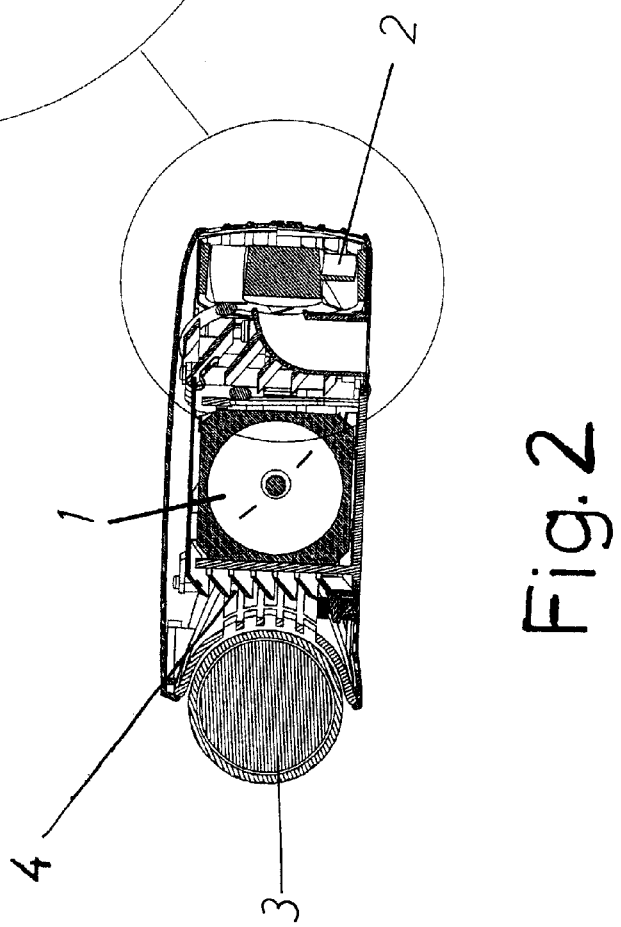

COOLING DEVICE IN A PROJECTOR

RELATED APPLICATIONS

This application claims the benefit of priority under 35 U.S.C. § 119 from Norwegian Application No. 20005115, filed Oct. 11, 2000.

TECHNICAL FIELD

The present invention relates to a device for cooling a light source in a compact projector.

BACKGROUND OF THE INVENTION

The current tendency is that the market in general desires small, compact and lightweight products. This trend also applies to video projectors. However, along with such a miniaturization of, for example, a video projector, there is also a need to minimize noise.

Theoretically it should be possible for a video projector to be noiseless, as it should be able to consist of only optical and electronic components. However, one of the main components of projectors is a strong light source, e.g., 120 watts or more, which generates substantial amounts of heat. The heat generated by the light source would damage the entire projector in the absence of a device for removing this heat. Thus, it is necessary to provide for the cooling or, alternatively, the removal of the heat with the aid, for example, of fans. However, fans used in devices of this type generate audible noise. Miniaturization of the components, including the fan, would not eliminate the noise because a smaller fan must be driven at a higher speed to produce an air flow that is sufficiently powerful to cool the projector and prevent heat damage.

With today's large video projectors this is not a serious problem because large, robust fans can be used to effectively remove the heat at low rotational speeds (RPM). The difficulties arise in compact projectors that use smaller fans, which are not constructed to withstand high temperatures. When a smaller, high flow-rate fan is used for removal of heat by suction of the hot air away from the light source and other overheated components, the fan itself will become heated and lubrication in its bearings will dry out faster, thereby reducing the service life of the fan.

SUMMARY OF THE INVENTION

In accordance with the present invention, a device for cooling a projector includes a plurality of air intakes positioned upstream from a suction fan having an integrated motor. A light source of the projector is disposed between a first one of the air intakes and the suction fan. The first air intake admits a first flow of air, drawn by the fan, that flows around and pulls heat away from the light source. A second one of the air intakes is arranged to admit a second flow of air, also drawn by the fan. The second flow of air passes through a duct that includes an outlet opening positioned adjacent an upstream side of the suction fan. The duct has a longitudinal axis that, at the outlet opening, is substantially coincident with the rotational axis of the fan motor so that the duct directs the second flow of air against the fan motor. The second flow of air, which has a temperature that is not substantially affected by the light source, cools the fan motor and forms an insulating layer that protects the fan motor from being damaged by the high temperatures of the first air flow.

An optional louver is positioned between the light source and the fan to prevent light from being emitted through the fan and to help direct the first flow of air evenly across the fan.

Additional aspects and advantages of this invention will be apparent from the following detailed description of a preferred embodiment thereof, which proceeds with reference to the accompanying drawings.

BRIEF DESCRIPTION OF THE DRAWINGS

FIG. 2 is a cross-sectional view of the projector and cooling device of FIG. 1 taken along line A—A of FIG. 1.

FIG. 3 is an enlarged fragmentary cross-sectional view of a portion of FIG. 2 showing the cooling device.

DETAILED DESCRIPTION OF A PREFERRED EMBODIMENT

Figure 1:
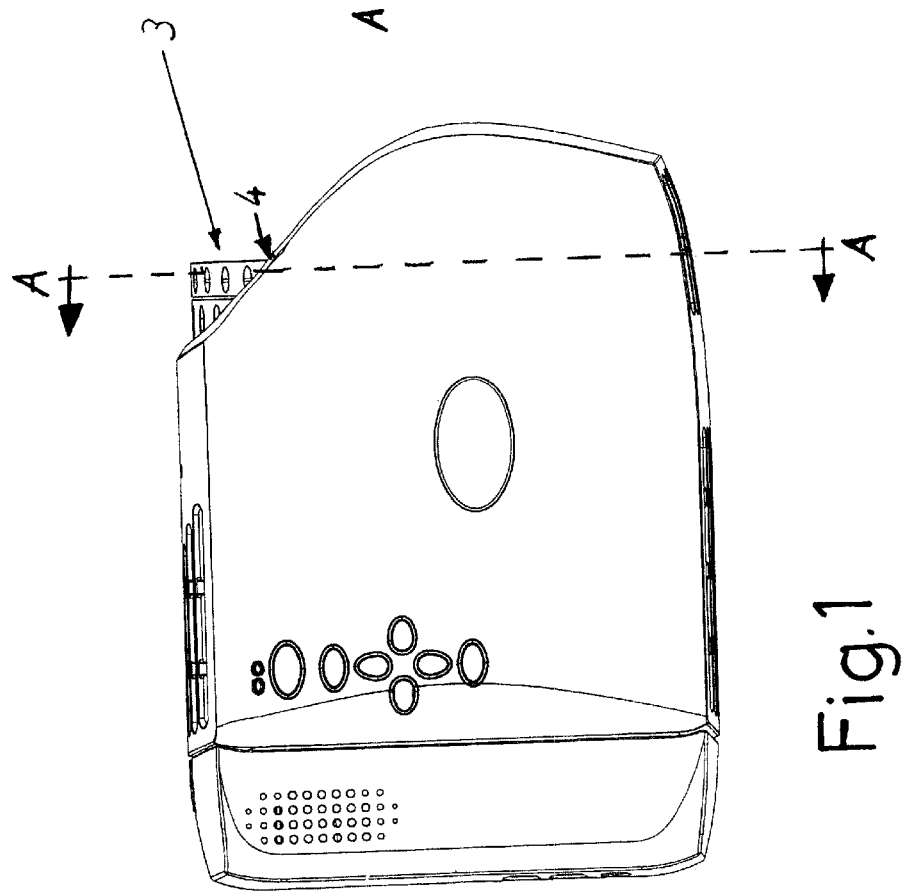
FIG. 1 shows a top plan view of a projector including a cooling device in accordance with the present invention.

FIG. 1 is a top plan view of a compact projector in accordance with the present invention. FIG. 2 is a cross-sectional view of the compact projector taken along line A—A of FIG. 1 and showing detail of a cooling device in accordance with the present invention. With reference to FIGS. 1 and 2, the compact projector includes a centrally-located light source 1, a suction fan 2 positioned on one side of light source 1, and an air intake 4 positioned opposite fan 2, adjacent a projection lens 3.

Figure 4:
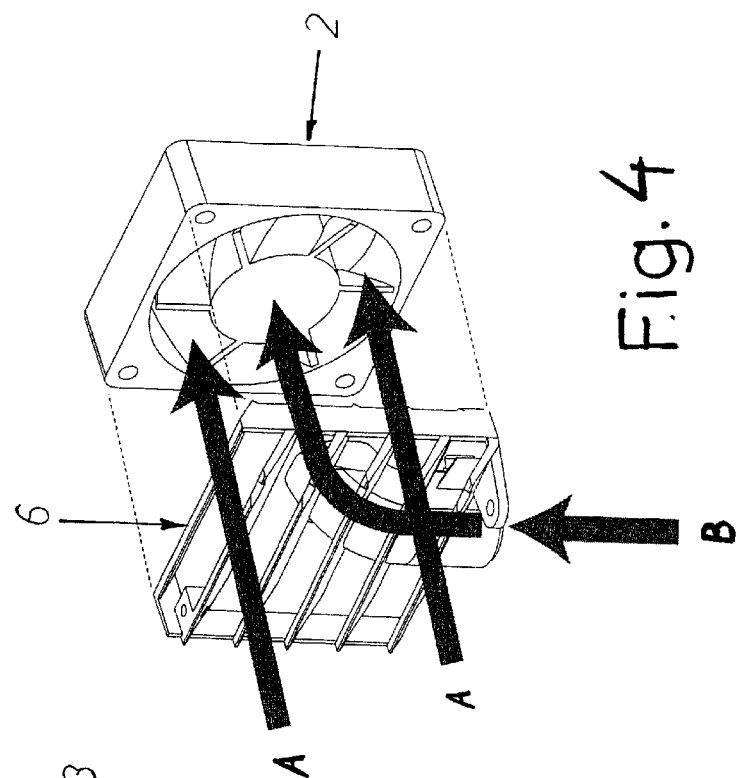
FIG. 4 is an enlarged schematic illustration in perspective view showing details of the cooling device of FIGS. 2 and 3.

FIG. 3 is an enlarged cross-sectional view showing detail of FIG. 2, including components of the cooling device. FIG. 4 is an enlarged schematic illustration in perspective view showing details of the cooling device of FIGS. 1–3. With reference to FIGS. 2–4, fan 2 draws a first air flow (A) into the projector through air intake 4 and over and around light source 1. Heat from light source 1 is transferred to first air flow (A) as it passes over light source 1. First flow of air (A) is then sucked through fan 2 and expunged from the projector. In order for a fan motor 7 of fan 2 to survive the high temperatures of the heated, first air flow (A), a second air flow (B) is also drawn by fan 2 through a duct 5 that terminates in a second inlet 8 positioned near the bottom of the projector. The temperature of second air flow (B) is substantially unaffected by light source 1.

In front of fan 2 is arranged a louver 6 that prevents light from being transmitted to the surroundings through the fan. In addition, the slats of the louver are disposed in a slanted position so that the vertical velocity of the first air flow (A) corresponds to the vertical velocity of the second air flow (B), but oriented in the opposite direction.

The vertical components of the first and second air flows (A) and (B) thus cancel each other out, and the cooler second air flow (B) will flow evenly along both sides of fan motor 7. There will occur no turbulence on the side of fan 2 facing the outside of the projector housing, and likewise the hot first air flow (A) will be distributed evenly around fan 2. A cold layer of air will remain situated around fan motor 7 to insulate fan motor 7 from the hot first air flow (A).

Duct 5 has a curvature and a uniform cross section over its entire length so that the second air flow (B) will have generally uniform velocity across the whole duct 5 to thereby minimize turbulence and pressure loss. The curvature of duct 5 is also important for imparting a vertical velocity component to second air flow (B), as mentioned above.

The second air flow (B) strikes fan motor 7 and is sucked along the side of fan motor 7. To ensure the optimal effect for the suction along fan motor 7, a gap 9 is provided between the fan motor and louver 6. For optimal performance, gap 9 is sized between 1 mm and 10 mm, and preferably approximately 3.5 mm.

It is difficult to stipulate a mathematical formula specifying an optimal relationship between the curvature of duct 5 and the slanted positioning of the slats of louver 6 needed to achieve cancellation of the vertical velocity components of first and second air streams (A) and (B). It is easiest to determine the radius of curvature of duct 5 by first selecting a slanted position of the slats of louver 6 sufficient to ensure that light is not emitted via the fan, and then experimenting with various curvatures of duct 5 until the best solution is found.

Louver 6 and duct 5 may be formed of integral one-piece construction.

It will also be possible to omit louver 6 when it is unnecessary to prevent light from escaping through fan 2, in which event the curvature of duct 5 would not be particularly critical. The main purpose of duct 5 would then be merely to deflect second air flow (B) so that fan motor 7 is evenly cooled.

It will be obvious to those having skill in the art that many changes may be made to the details of the above-described embodiment of this invention without departing from the underlying principles thereof. The scope of the present invention should, therefore, be determined only by the following claims.

What is claimed is:

1. A device for cooling a projector having an interior, an exterior, and a heat-emitting light source positioned within the interior, comprising:
    a suction fan having an integrated motor and an upstream side, the suction fan positioned to draw a first air flow through the interior of the projector and to direct the first air flow away from the projector, the suction fan positioned so that at least a portion of the first air flow passes around the light source and carries away from the light source heat emitted by the light source; and
    a duct extending between the exterior of the projector and the upstream side of the suction fan adjacent the integrated motor so that the suction fan draws a second air flow through the duct and around the integrated motor, the second air flow having a temperature that is appreciably unaffected by the light source to thereby cool the integrated motor and prevent the integrated motor from being damaged by heat carried in the first air flow.

2. The device according to claim 1, further comprising a louver positioned within the interior of the projector and proximal of the suction fan such that the first air flow passes through the louver.

3. The device according to claim 1 in which the duct has a length and a uniform cross section across its entire length to prevent turbulence in the second air flow.

4. The device according to claim 1 in which the duct is of a curved shape that prevents turbulence in the second air flow.

5. The device according to claim 1 in which the duct is of a curved shape that prevents pressure loss in the second air flow.

6. The device according to claim 1 in which the duct is spaced apart from the integrated motor to form a gap.

7. The device according to claim 6 in which the gap is sized between approximately 1 mm and approximately 10 mm.

8. The device according to claim 6 in which the gap is sized approximately 3.5 mm.

9. A projector comprising:
    a light source that emits heat;
    a duct to facilitate direction of airflow; and
    a suction fan having an integrated motor, positioned to draw a first air flow independent of the duct to pass over the light source to carry away heat emitted by the light source, and a second air flow through the duct to pass over the integrated motor to cool the integrated motor.

10. The projector of claim 9, wherein the projector further comprises a louver positioned to allow the first air flow to be drawn through the louver.

* * * * *